United States Patent [19]

Tanaka

[11] Patent Number: 4,833,944
[45] Date of Patent: May 30, 1989

[54] TRANSMISSION RATIO CONTROL SYSTEM FOR A CONTINUOUSLY VARIABLE TRANSMISSION

[75] Inventor: Hiroshi Tanaka, Tokyo, Japan

[73] Assignee: Fuji Jukogyo Kabushiki Kaisha, Tokyo, Japan

[21] Appl. No.: 88,061

[22] Filed: Aug. 21, 1987

[30] Foreign Application Priority Data

Aug. 23, 1986 [JP] Japan .................... 61-197493

[51] Int. Cl.$^4$ ........................................ B60K 41/14
[52] U.S. Cl. ........................................ 74/866; 74/870
[58] Field of Search ............... 74/870, 877, 864, 866, 74/868, 865; 364/424.1

[56] References Cited

U.S. PATENT DOCUMENTS

| | | | |
|---|---|---|---|
| 4,622,865 | 11/1986 | Itoh et al. | 74/866 |
| 4,623,773 | 12/1986 | Itoh et al. | 74/868 |
| 4,649,486 | 3/1987 | Oshiage | 74/866 |
| 4,663,990 | 5/1987 | Itoh et al. | 74/866 |
| 4,669,334 | 6/1987 | Miyaura et al. | 74/866 |
| 4,682,519 | 7/1987 | Okada et al. | 74/868 |
| 4,683,779 | 8/1987 | Osanai et al. | 74/866 |
| 4,704,683 | 11/1987 | Osanai | 364/424.1 |
| 4,710,879 | 12/1987 | Vahabzadeh | 364/424.1 |
| 4,720,793 | 1/1988 | Watanabe et al. | 74/866 |

FOREIGN PATENT DOCUMENTS 59-208253 11/1984 Japan .
60-88259 5/1985 Japan .

Primary Examiner—Dirk Wright
Assistant Examiner—Harold F. Macris
Attorney, Agent, or Firm—Martin A. Farber

[57] ABSTRACT

A control system for a continuously variable transmission for a motor vehicle has a transmission ratio control valve having a spool for controlling oil supplied to a cylinder of a drive pulley to change the transmission ratio. The transmission ratio control valve has chambers at both ends of the spool. By controlling flow rate of oil supplied to the chambers in accordance with a desired transmission ratio, the spool is shifted, so that the transmission ratio changing rate is controlled. At kickdown of the transmission, two desired value signals are applied to correct the desired transmission ratio and desired transmission ratio changing rate so as to quickly increase the transmission ratio to a value smaller than the desired transmission ratio at the kickdown.

14 Claims, 8 Drawing Sheets

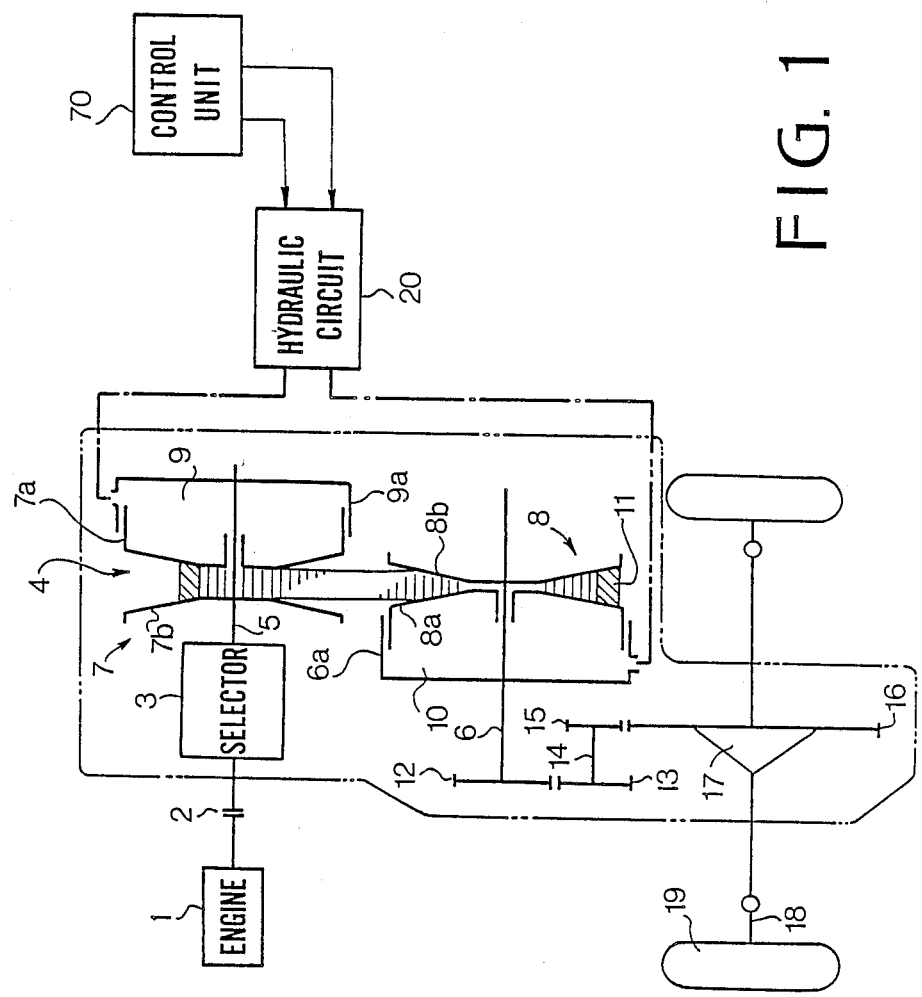

TRANSMISSION RATIO CONTROL SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling the transmission ratio at quick downshifting for rapid acceleration, such as kickdown.

A known control system for a continuously variable belt-drive transmission comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a hydraulic circuit including a pump for supplying oil to the servo devices, a line pressure control valve and a transmission ratio control valve. Each valve comprises a spool to control the oil supplied to the servo devices.

The transmission ratio control valve operates to decide the transmission ratio in accordance with the opening degree of a throttle valve of an engine and the speed of the engine. The line pressure control valve is adapted to control the line pressure in accordance with the transmission ratio and the engine speed. The line pressure is controlled to prevent the belt from slipping on pulleys in order to transmit the output of the engine.

At the start of the vehicle, the transmission ratio is set at a maximum value. When the vehicle speed and engine speed reach set values under a driving condition, the transmission ratio starts to change (to upshift). The transmission ratio is automatically and continuously reduced at a speed which is decided by line pressure, pressure of oil supplied to the servo device of the drive pulley, and actual transmission ratio.

When command of rapid acceleration of the vehicle, which is dependent on driver's operation of an accelerator pedal, is inputted in the control system, it is necessary to downshift the transmission or to control the transmission ratio to meet the requirement.

Various systems for controlling the transmission ratio at transient state are disclosed. Japanese Patent Application Laid-Open No. 59-208253 discloses a system wherein a transmission ratio is fixed to a predetermined value at an initial stage of acceleration. Further, Japanese Patent Application Laid-Open No. 60-88259 discloses a system which determines changing speed of desired transmission ratio in dependency on the operating speed of an accelerator pedal.

However, in accordance with the system of the prior art, the actual transmission ratio does not change to provide rapid acceleration of the vehicle at quick depression of an accelerator pedal so as to meet driver's demand.

SUMMARY OF THE INVENTION

The object of the present invention is to provide a system which may control the transmission ratio so as to meet the requirement of driver's wishes for acceleration of a vehicle.

The other objects and features of this invention will become understood from the following description with reference to the accompanying drawings.

BRIEF DESCRIPTION OF THE DRAWINGS

FIG. 1 is a schematic illustration of a continuously variable belt-drive transmission;

DETAILED DESCRIPTION OF THE PREFERRED EMBODIMENT

Figure 2A:
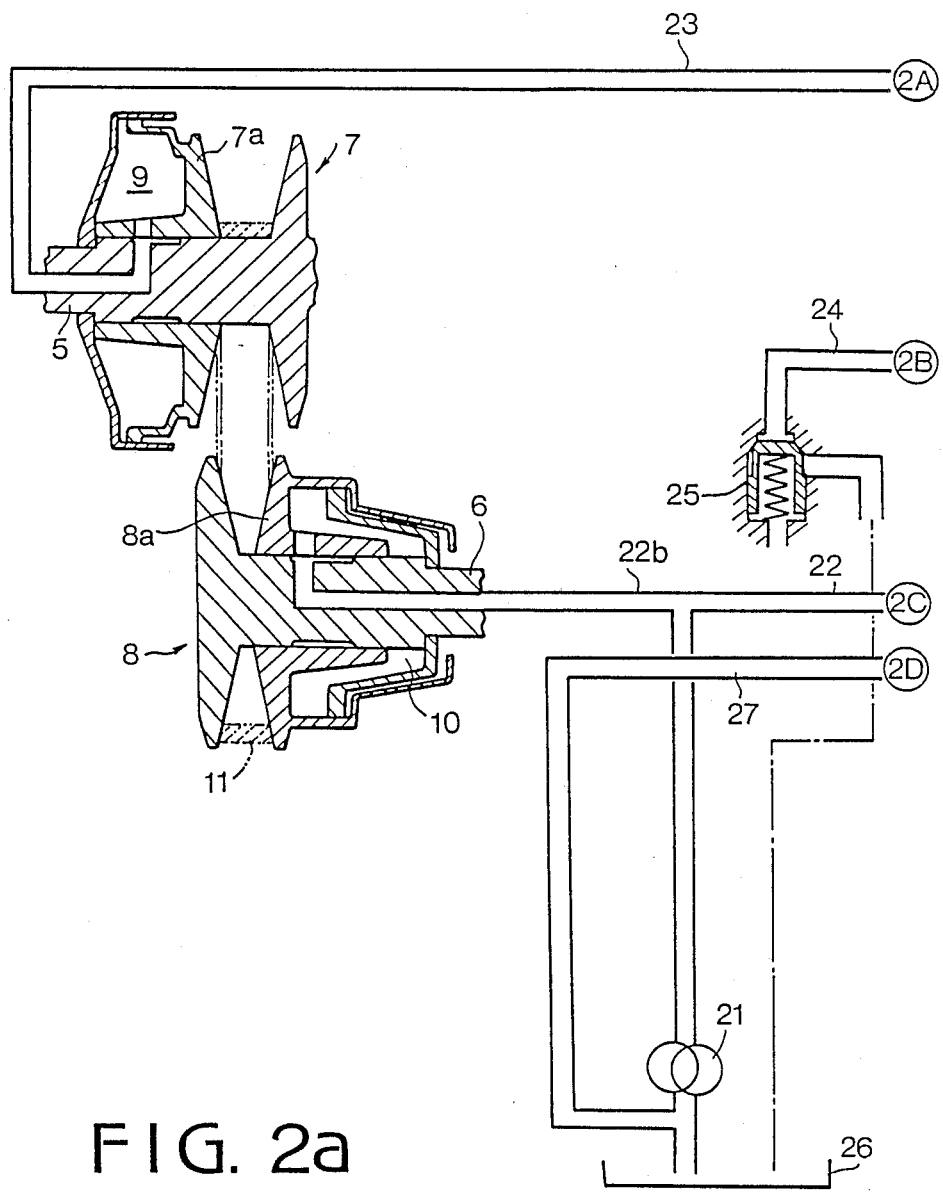
FIGS. 2a and 2b are schematic diagrams showing a control system according to the present invention.

Referring to FIG. 1, a motor vehicle is provided with an engine 1, an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on shafts 5 and 6 respectively. A fixed conical disc 7b of the drive pulley 7 is integral with main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A chamber 10 of the servo device is also communicated with control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of vehicle driving wheels 19 through a differential 17.

Figure 2B:
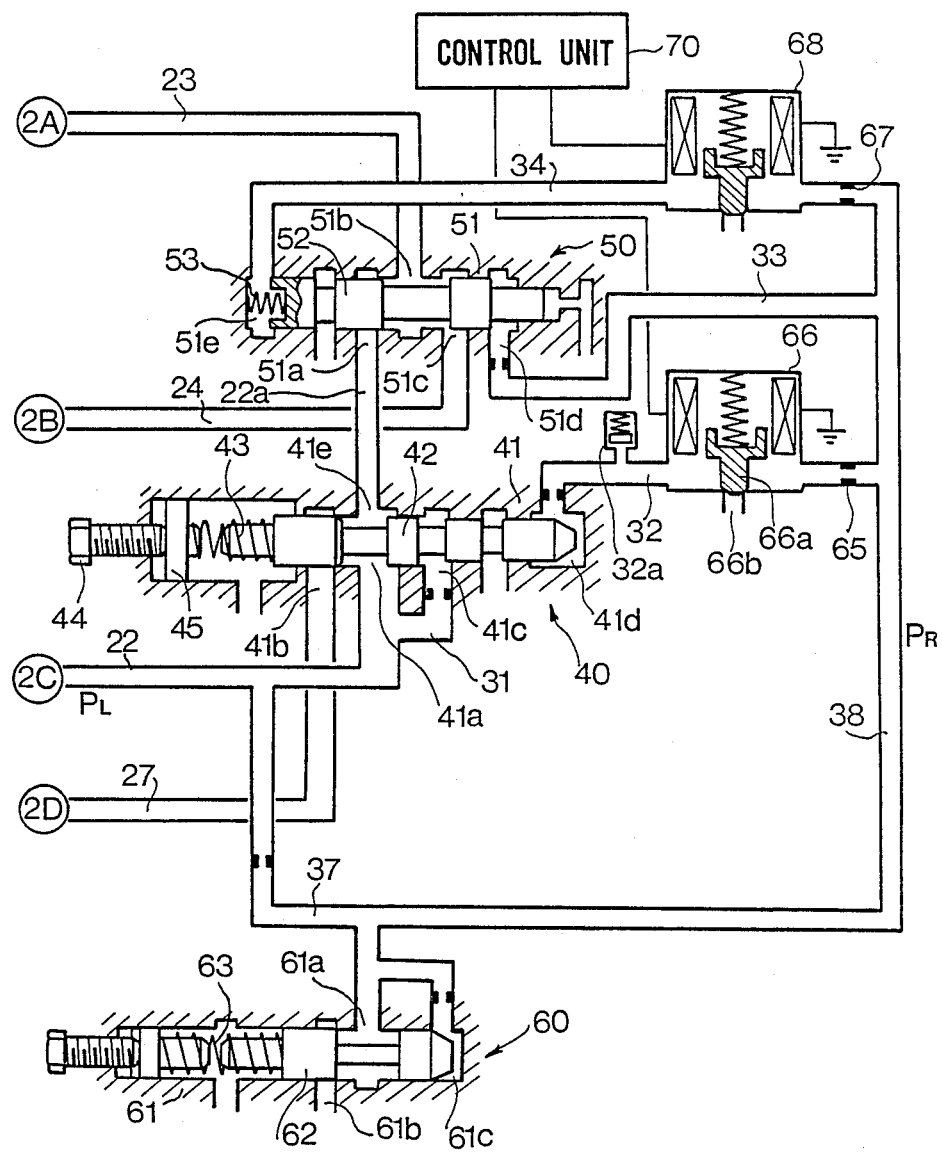

Referring to FIGS. 2a and 2b, chamber 9 of the drive pulley 7 is supplied with pressurized oil by an oil pump 21 from an oil reservoir 26 passing through a line pressure conduit 22, ports 41a and 41e of a line pressure control valve 40, transmission ratio control valve 50, and conduit 23. The chamber 10 of driven pulley 8 is applied with pressurized oil through a passage 22b without passing through valves 40 and 50. The movable conical disc 7a of the drive pulley 7 is so designed that the pressure receiving area thereof is larger than that of movable conical disc 8a of the driven pulley 8.

The line pressure control valve 40 comprises a valve body 41, spool 42, and chambers 41c and 41d. The spool 42 is applied with pressure of the pressurized oil in the chamber 41c supplied through a conduit 31. The other end of the spool 42 is applied with the force of a spring 43 provided between the end of the spool 42 and a retainer 45, the position of which is adjustable by a screw 44. The port 41a is communicated with a drain port 41b for a drain passage 27 in accordance with the position of a land of the spool 42. The drain port 41b communicates with oil reservoir 26 through passage 27.

The transmission ratio control valve 50 comprises a valve body 51, spool 52, and a spring 53 for urging the spool 52 in the downshift direction. A port 51b of the valve body 51 is selectively communicated with a pressure oil supply port 51a or a drain port 51c in accordance with the position of lands of spool 52. Port 51b communicates with chamber 9 through conduit 23, and port 51a communicates with port 41e of line pressure control valve 40 through conduit 22a. The drain port 51c is communicated with the oil reservoir 26 through a conduit 24 and a check valve 25.

The system is provided with a regulator valve 60, and solenoid operated on-off valves 66 and 68.

The regulator valve 60 comprises a valve body 61, an inlet port 61a connected to the pump 21 through passages 37 and 22, a spool 62, an end chamber 61c connected to the passage 37, and a spring 63 urging the spool 62 to the chamber 61c. When the pressure of oil in the chamber 61c becomes higher than a set value, the spool 62 is shifted to the left, so that an inlet port 61a communicates with a drain port 61b to drain the oil. Thus, a constant pressure of oil is provided in the passage 37. The passage 37 is communicated with the chamber 41d of line pressure control valve 40 through a constant pressure passage 38, orifice 65, solenoid operated on-off valve 66, and passage 32 having an accumulator 32a. Further, the passage 38 is communicated with an end chamber 51d of the transmission ratio control valve 50 through a passage 33, and with another end chamber 51e through an orifice 67, solenoid operated on-off valve 68 and passage 34. The solenoid operated on-off valve 66 is adapted to be operated by pulses. When energized, a valve 66a opens a drain port 66b. The pulsation of the pressure of oil in the passage 32 is smoothed by accumulator 32a. The solenoid operated on-off valve 68 is the same as valve 66 in construction and operation. The valves 66 and 68 are operated by signals from a control unit 70. Thus, pressure controlled by the valves 66 and 68 is applied to chambers 41d and 51e.

In the transmission ratio control valve 50, pressure receiving area of the spool 52 at chamber 51e is set to a value larger than the area at the chamber 51d. On the other hand, the control pressure in the chamber 51e can be changed between a maximum value, which is the same as the constant pressure in the chamber 51d, when the duty ratio is 0% and zero by controlling the duty ratio of pulses for operating the valve 68. The transmission ratio control valve 50 is so arranged that the spool 52 is at a neutral position at a middle duty ratio (for example 50%) and is located in an oil supply position by increasing the duty ratio from the middle duty ratio because of reduction of control pressure in the chamber 51e. Further, the speed of the movement of the spool 52 changes with the magnitude of changing of the duty ratio. The spool 52 is shifted to an oil drain position by decreasing the duty ratio. It will be understood that when the oil is supplied to the chamber 9, the transmission is upshifted.

The duty ratio is decided by the transmission ratio changing speed (rate) and the transmission ratio.

When the transmission is upshifted, the duty ratio D is a decreasing function of the actual transmission ratio i and an increasing function of the transmission ratio changing speed (rate) di/dt. When the transmission is downshifted, the duty ratio D is an increasing function of the actual transmission ratio i and a decreasing function of the transmission ratio changing speed di/dt.

In a feedback control system, the transmission ratio changing speed di/dt can be decided by the difference between the actual transmission ratio i and a desired transmission ratio id, as follows.

$$di/dt = K1 \ (id - i)$$

where K1 is a coefficient

However, the response of the transmission control system including various mechanisms is slow, which means that the convergence of the actual transmission ratio to the desired transmission ratio delays.

In order to eliminate the control delay, the transmission ratio changing speed (rate) di/dt is corrected by the speed (rate) of of the desired transmission ratio (did/dt), as follows.

$$di/dt = K1 \ (id - i) + K2 \cdot did/dt$$

where K2 is a coefficient.

The desired transmission ratio changing speed did/dt is to advance the phase of the control operation. Thus, the response of the system can be improved. In order to decide the upshift or the downshift, the equation is rewritten as follows.

$$di/dt + K1 \ \{(id + K2/K1 \cdot did/dt) - i\}$$

The transmission is downshifted when $(id + K2/K1 \cdot did/dt) >$ and $di/dt > 0$. The transmission is upshifted when $(id + K2/K1 \cdot did/dt) > i$, and $di/dt > 0$. The speed (rate) did/dt is obtained by the amount ($\Delta id$) of change of the desired transmission ratio at a predetermined intervals ($\Delta t$), that is $\Delta id / \Delta t$.

The coefficient K1 may be changed in accordance with the opening degree of the throttle valve, and the coefficient K2 may also be changed in accordance with physical conditions of the system, such as viscosity of oil used in the system.

Figure 3:
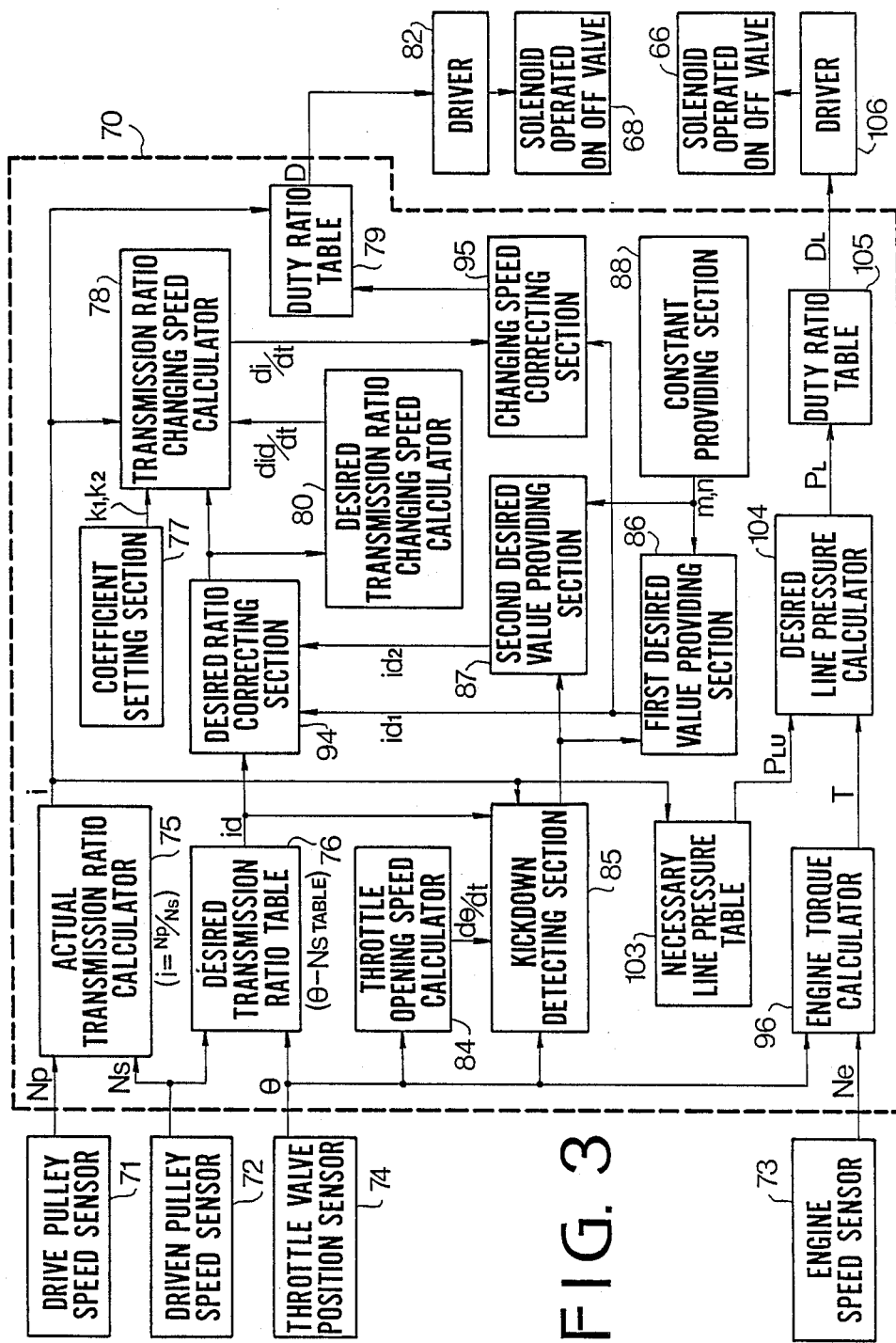
FIG. 3 is a block diagram showing a control unit.

Referring to FIG. 3, the system is arranged to control the transmission ratio in accordance with the above described principle. In the system, a drive pulley speed sensor 71, driven pulley speed sensor 72, engine speed sensor 73 and throttle position sensor (or intake manifold pressure sensor) 74 are provided. Output signals $N_p$ and $N_S$ of sensors 71, 72 are fed to an actual transmission ratio calculator 75 to produce an actual transmission ratio i in accordance with $i = N_P/N_S$. Output signal $N_S$ and output signal $\theta$ representing the opening degree of the throttle position sensor 74 are fed to a desired transmission ratio table 76. The desired transmission ratio id is derived from the table 76 in accordance with the signals $N_S$ and $\theta$.

The desired transmission ratio id is fed to a transmission changing speed calculator 78 and to a desired transmission ratio changing speed calculator 80 through a desired ratio correcting section 94. The calculator 80 produces a desired transmission ratio changing speed (rate) did/dt. A coefficient setting section 77 produces coefficients K1 and K2. The actual transmission ratio i, desired transmission ratio changing speed did/dt and coefficients K1 and K2 are applied to transmission ratio changing speed calculator 78 to produce a transmission ratio changing speed di/dt from the formula $di/dt = K1(id - i) + K2 \cdot did/dt$.

The speed di/dt and the actual transmission ratio i are applied to a duty ratio table 79 through a changing speed correcting section 95 to derive the duty ratio D. The duty ratio D is supplied to the solenoid operated on-off valve 68 through a driver 82.

The system is provided with a control system for quick change of transmission ratio such as kickdown as described hereinafter. The throttle opening degree $\theta$ of the throttle position sensor 74 is fed to a throttle opening speed calculator 84 which produces opening speed (rate) $d\theta/dt$. The actual transmission ratio i, desired transmission ratio id, throttle opening degree $\theta$, and throttle opening speed $d\theta/dt$ are applied to a kickdown detecting section, 85, where a kickdown is detected in accordance with the difference between the desired transmission ratio id and the actual transmission ratio i, and the throttle opening speed $d\theta/dt$ at the time when the throttle valve opening degree $\theta$ exceeds a predetermined. An output, kickdown signal of the section 85 is applied to a first desired value providing section 86 and a second desired value providing section 87. A constant providing section 88 is provided for producing a constant m which is applied to the first desired value providing section 86 and for producing a constant n applied to the second desired value providing section 87.

The first desired value providing section 86 produces a first desired value idl for quick downshifting of the transmission. The first desired value $id_1$ is obtained by $$id_1 = (id_0 - i_0) \cdot m + i_0,$$

where $i_0$ is a transmission ratio before the accelerator pedal is depressed, and $id_0$ is a desired transmission ratio at the kickdown. The first desired value $id_1$ is fed to the correcting section 94 and to correcting section 95. The correcting section 94 produces a desired transmission ratio signal representing the value $id_1$ and the correcting section 95 corrects the transmission ratio changing speed (rate) $di/dt$ to a high speed (rate). The first desired value $id_1$ is cleared when the actual transmission ratio i becomes larger than the first desired value $id_1$ ($i > id_1$)

The second desired value providing section 87 produces a second desired value $id_2$ for correcting the desired transmission ratio id. The second desired value $id_2$ is $$id_2 = (id_0 - i_0) \cdot n + i_0.$$

The second desired value $id_2$ is fed to the correcting section 94 after the first desired value $id_1$ is cleared. When the actual transmission ratio i becomes larger than the desired transmission ratio $id_2$ ($i > id_2$), the second desired value $id_2$ is cleared.

In the constant providing section 88, the constant m is determined such that the first desired value $id_1$ is smaller than the second desired value $id_2$ ($id_1 21 id_2$, and the constant n is determined such that the second desired value $id_2$ is smaller than the desired transmission ratio $id_0$ ($id_2 < id_0$).

Further, the output signal $\theta$ of throttle position sensor 74 and the output $N_e$ of engine speed sensor 73 are fed to an engine torque calculator 96, so that engine torque T is calculated based on throttle position 8 and engine speed $N_e$.

On the other hand, the actual transmission ratio i from the calculator 75 is applied to a necessary line pressure table 103 to derive a necessary line pressure $P_{LU}$ per unit torque. The necessary line pressure $P_{LU}$ and the engine torque T are applied to a desired line pressure calculator 104 where a desired line pressure $P_L$ is calculated.

The desired line pressure $P_L$ is applied to a duty ratio table 105 to derive a duty ratio $D_L$ corresponding to the desired line pressure $P_L$. The duty ratio $D_L$ is supplied to a driver 106 which operates the solenoid operated on-off valve 66 at the duty ratio.

In operation, while the vehicle is at a stop, chamber 10 of the driven pulley 8 is supplied with line pressure through passage 22b, and the chamber 9 of the drive pulley 7 is drained, since the $N_P$, $N_s$, $\theta$ are zero and duty ratio are zero, and the spool 52 is at the right end position and the drain port 51c communicates with the chamber 9 through the conduit 23 as shown in FIGS. 2a and 2b. Thus, in the pulley and belt device of the continuously variable belt-drive transmission, the driving belt 11 engages with the driven pulley 8 at a maximum running diameter to provide the largest transmission ratio (low speed stage).

When the accelerator pedal is depressed, the clutch current increases progressively with increase of engine speed. The electromagnetic clutch 2 is gradually engaged, transmitting the engine power to the drive pulley 7. The power of the engine is transmitted to the output shaft 6 at the largest transmission ratio by the driving belt 11 and driven pulley 8, and further transmitted to axles of the driving wheels 19. Thus, the vehicle is started. When the vehicle speed (output signal $N_s$) exceeds a predetermined value, the clutch 2 is entirely engaged.

At the start of the vehicle, the line pressure is at the highest value by the pressure control valve 40, since the duty ratio for the valve 66 is large, and the spool 42 of the control valve 40 is at the right end position.

When the throttle valve is opened for acceleration of the vehicle, the desired transmission ratio changing speed did/dt and transmission ratio changing speed di/dt are calculated at calculators 80 and 78. The transmission ratio changing speed di/dt is fed to the duty ratio table 79, so that duty ratio D for valve 68 is obtained from the table 79.

When the depression of the accelerator pedal stops, the transmission ratio changing speed di/dt becomes negative. Accordingly the value of the duty ratio D becomes larger than the neutral value, so that the pressure in the chamber 51d of the control valve 50 is higher than the chamber 51e. Thus, the spool 52 is shifted to the left to communicate the port 51a with port 51b, so that oil is supplied to the chamber 9 through the conduit 23 to upshift the transmission. When the actual transmission ratio i reaches the desired transmission ratio id, the changing speed di/dt becomes zero, so that the upshifting operation stops.

As the difference between the desired ratio id and actual ratio i becomes large and the desired transmission ratio changing speed di/dt becomes large, the duty ratio D for the valve 68 becomes large, thereby increasing the shifting speed of the spool 52 to increase the actual transmission changing speed.

When the opening degree of the throttle valve is reduced for deceleration, the duty ratio is reduced along a low engine speed line, thereby shifting the spool 52 to the right to drain the chamber 9. Thus, the transmission is downshifted. The transmission changing speed at downshifting increases with reducing of the duty ratio.

The control operation of line pressure will be described hereinafter. From the engine torque calculator 96, a torque T is obtained in accordance with throttle position $\theta$ and engine speed $N_e$, which is applied to desired line pressure calculator 104. The calculator calculates a desired line pressure $P_L$. The solenoid operated on-off valve 66 is operated at a duty ratio corresponding to the desired line pressure $P_L$. The line pressure is applied to chamber 10 to hold the belt 11 at a necessary minimum force, the transmitting torque at which is slightly larger than torque T. Thus, power is transmitted through the transmission without slipping of the belt.

Figure 5:
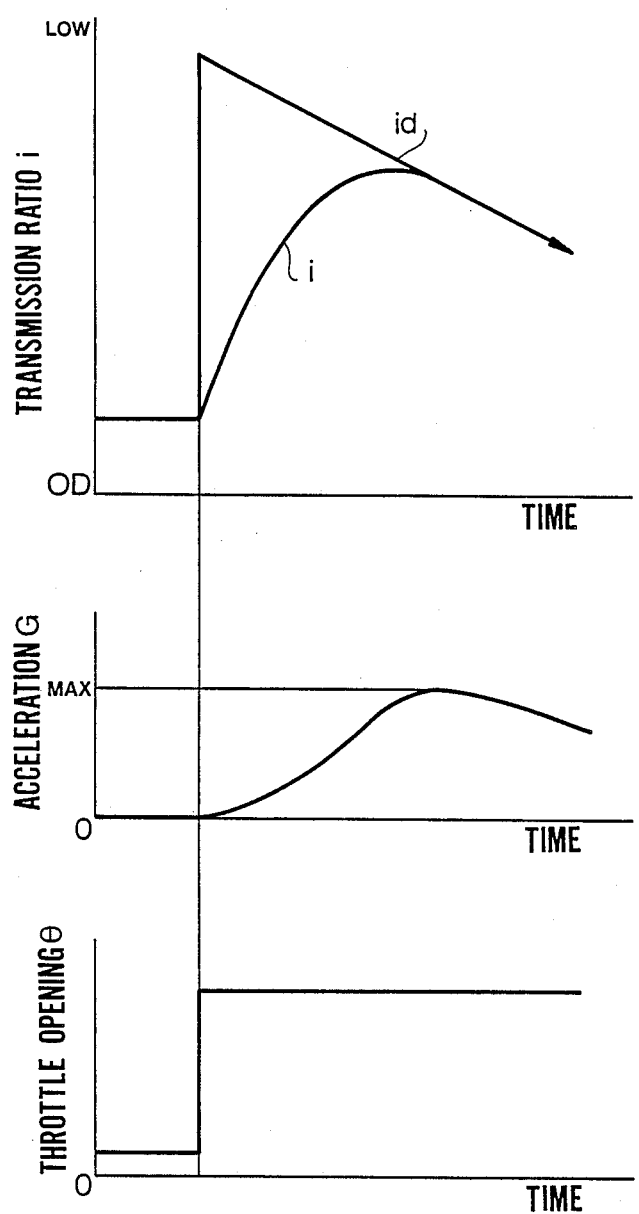
FIGS. 5 and 6 are graphs showing acceleration characteristics.

FIG. 5 shows an acceleration characteristic in steady state. When the accelerator pedal is depressed, the actual transmission ratio i increases in accordance mainly with the difference K1 (id−i) to the desired transmission ratio id. As the actual ratio i approaches the desired ratio id, the ratio i gradually reduces so as to smoothly coincide with ratio id in accordance with the change of $K_2 \cdot did/dt$.

Figure 4A:
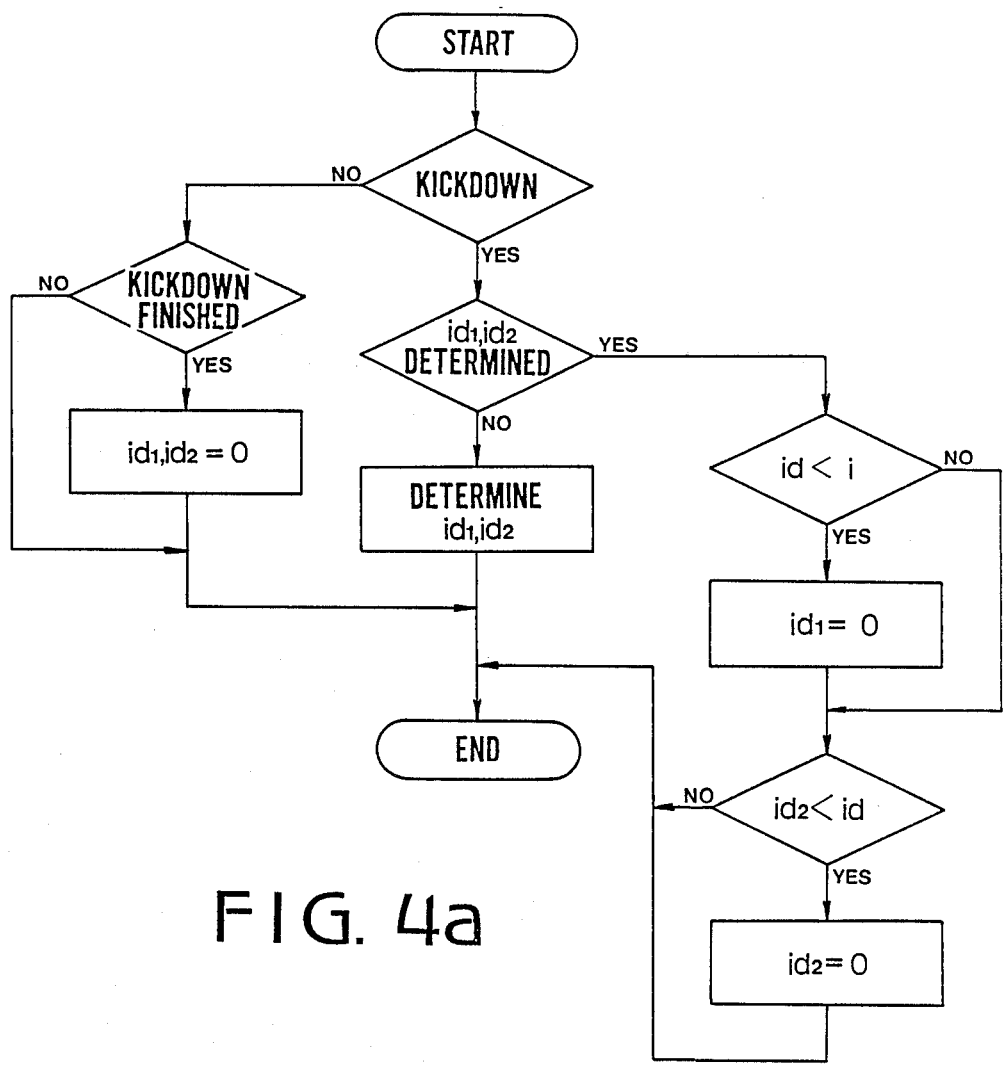
FIGS. 4a and 4b are flowcharts showing the operation of the system.
Figure 4B:
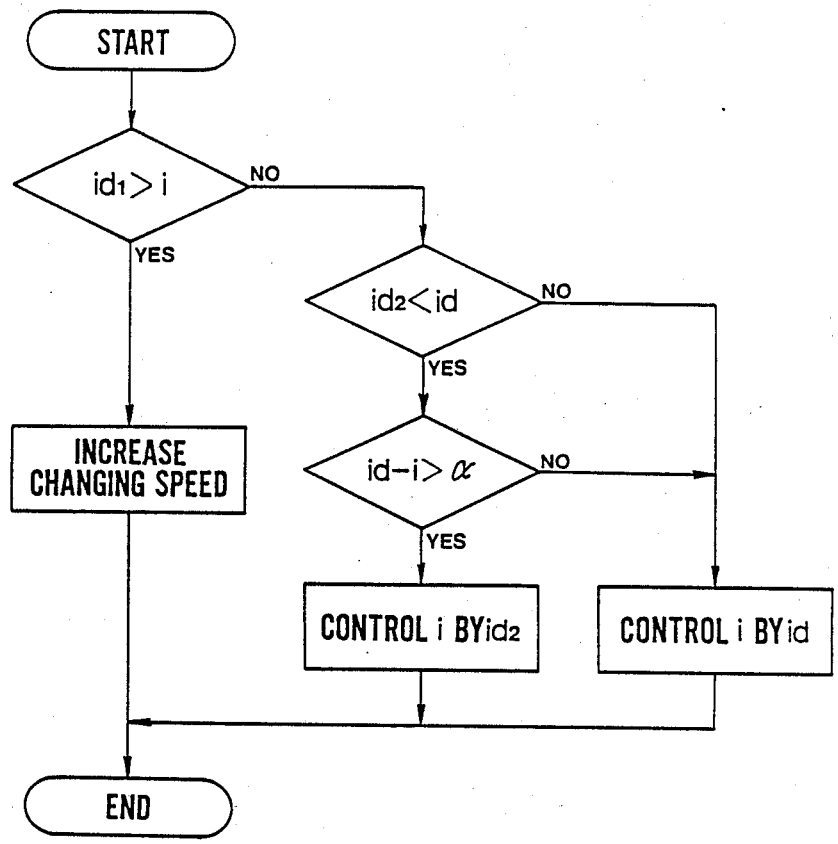
Figure 6:
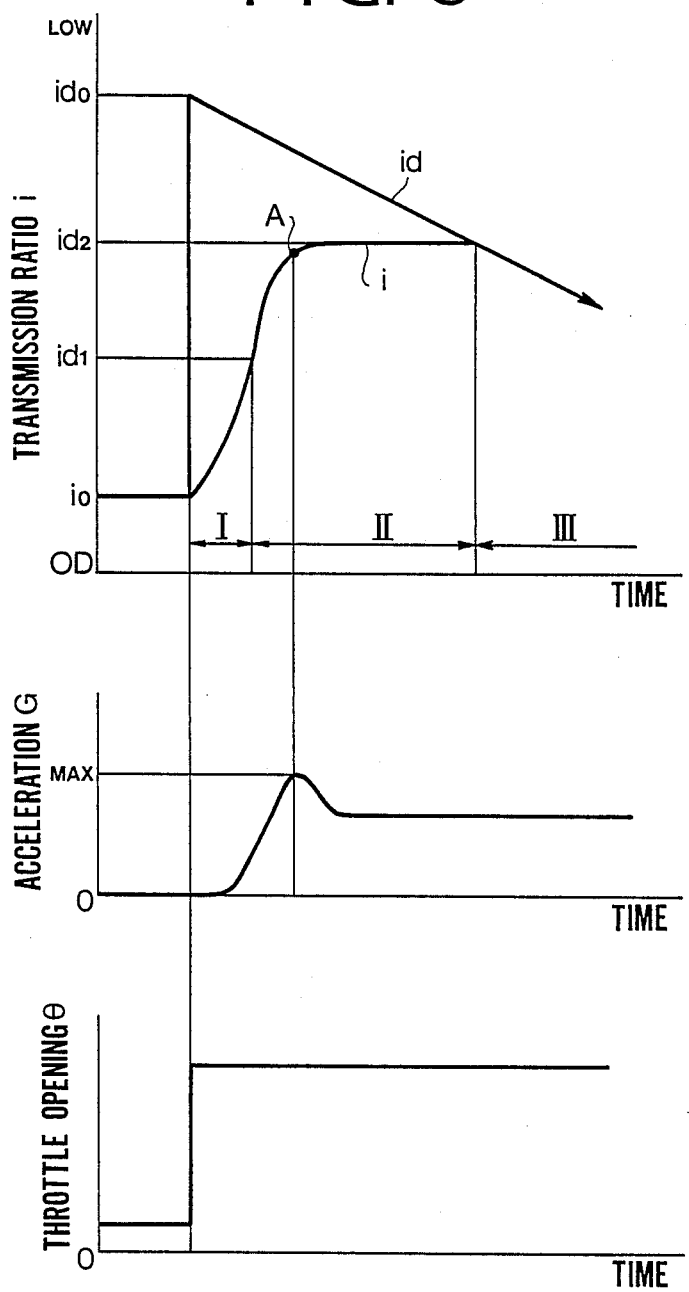

The transmission ratio control at the kickdown is described hereinafter with reference to FIGS. 4a, 4b and 6.

When the accelerator pedal is quickly and greatly depressed, the kickdown detecting section 85 detects the kickdown. The first and second desired value $id_1$ and $id_2$, which are different from the desired transmission ratio in steady state, are derived from the first and second value providing sections 86 and 87. The first desired value $id_1$ is fed to the correcting sections 94 and 95 to set the desired transmission ratio to the value $id_1$ at section 94, and to increase transmission ratio changing speed di/dt at the section 95. Thus, the actual transmission ratio i is rapidly increased. As shown in FIG. 6, in the range I ($i_0$ to $id_1$), the actual transmission ratio i is quickly increased. When the actual ratio i becomes larger than the first desired value $id_1$ ($i>id_1$), the first desired value $id_1$ becomes zero ($id_1=0$). Then, the second desired value $id_2$ is fed to the correcting section 94 to set the desired transmission ratio to the value $id_2$. In the range II ($id_1$ to $id_2$), the actual transmission ratio is increased in accordance with the second desired value $id_2$, so that the actual transmission ratio i coincides with the second desired value $id_2$ at a point A. At the point A, the acceleration approaches a maximum acceleration Gmax because of the large transmission ratio. Thereafter, the ratio i converges to the desired transmission ratio id. In the range III, the second desired value $id_2$ becomes zero, so that the actual ratio i is controlled in accordance with the desired transmission ratio id.

Each of constants m and n can be changed with a predetermined parameter. For example, during high speed driving, the constant n is set to a large value to provide a large driving power. When the throttle opening rate $d\theta/dt$ is large, constant m is set to a large value, so that the actual ratio i is quickly converged to the desired value.

In accordance with the present invention, a transient state distinct from a steady state is provided at full throttle acceleration such as kickdown, in which the transmission ratio is quickly increased to a large value, so that a maximum acceleration is obtained in accordance with driver's demand.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a control system for a continuously variable transmission for transmitting power of an internal combustion engine, the transmission having a drive pulley including a hydraulically shiftable first disc and a hydraulic cylinder for operating the disc, a driven pulley including a hydraulically shiftable second disc and a hydraulic cylinder for operating the second disc, and a belt engaged with both pulleys, the control system comprising a hydraulic circuit including a pump for supplying oil to both the hydraulic cylinders, a transmission ratio control valve including a shiftable spool for controlling the oil supplied to the cylinder of the drive pulley to change transmission ratio of the transmission to a desired transmission ratio, shifting means for shifting the spool, sensing means for sensing operating conditions of the engine and the transmission and for producing condition signals dependent on the conditions, actual transmission ratio signal producing means responsive to the condition signals for producing an actual transmission ratio signal corresponding to the actual transmission ratio of the transmission, desired transmission ratio signal producing means responsive to the condition signals for producing a desired transmission ratio signal corresponding to a desired transmission ratio, transmission ratio changing speed signal producing means responsive to the actual transmission ratio signal and to the desired transmission ratio signal for producing a transmission ratio changing rate signal corresponding to a transmission ratio changing rate, and control signal producing means responsive to the transmission ratio changing rate signal for producing a control signal for operating the shifting means to shift the spool dependent on the transmission ratio changing rate for changing the actual transmission ratio of the transmission to the desired transmission ratio, the improvement of the control system comprising detecting means responsive to the condition signals for detecting rapid acceleration of the engine and for producing an acceleration signal, desired value signal producing means responsive to the acceleration signal for producing a second desired value signal representing a second desired transmission ratio value smaller than an initial desired transmission ratio value at the rapid acceleration and for producing a first desired value signal representing a first desired transmission ratio value smaller than the second desired transmission ratio value, desired transmission ratio correcting means responsive to the first desired value signal for correcting the desired transmission ratio signal to correspond to the first desired transmission ratio value of the first desired value signal for quickly increasing the actual transmission ratio, said correcting means being further responsive to the second desired value signal for correcting the desired transmission ratio signal to correspond to the second desired transmission ratio value of the second desired value signal for correcting the actual transmission ratio to the second desired transmission ratio value after the actual transmission ratio reaches the first desired transmission ratio value, whereby the actual transmission ratio is quickly increased to a large value so that maximum acceleration is obtained at the rapid acceleration in accordance with driver demand.

2. The control system according to claim 1 wherein the transmission ratio control valve has chambers at both ends of the spool, the shifting means includes a second hydraulic circuit for supplying oil to the chambers, and control valve means provided with the second hydraulic circuit for controlling flow rate of control oil supplied to at least one of the chambers of the transmission ratio control valve.

3. The control system according to claim 2 wherein the control valve means is a solenoid operated on-off valve, and the control signal comprises pulses, the duty ratio of which is changed so as to control the transmission ratio changing speed rate.

4. The control system according to claim 2 wherein the second hydraulic circuit is provided with a regulator valve for maintaining the pressure of oil in the second hydraulic circuit at a constant value.

5. The control system according to claim 1 wherein the sensing means comprises a drive pulley speed sensor, driven pulley speed sensor and throttle valve position sensor.

6. The control system according to claim 1, wherein said desired value signal producing means determines said first desired transmission ratio value as the sum of an actual transmission ratio value before the rapid acceleration plus a first constant multiplied by the difference of the actual transmission ratio value before the rapid acceleration from the initial desired transmission ratio value at the rapid acceleration.

7. The control system according to claim 6, wherein said desired value signal producing means determines said second desired transmission ratio value as the sum of the actual transmission ratio value before the rapid acceleration plus a second constant multiplied by the difference of the actual transmission ratio value before the rapid acceleration from the initial desired transmission ratio value at the rapid acceleration.

8. The control system according to claim 7, further comprising
constant providing means for providing said first and second constants.

9. The control system according to claim 8, further comprising
constant providing means for providing said first and second constants in accordance with a predetermined parameter.

10. The control system according to claim 9, wherein said constant providing means sets said second constant to a large value during high speed driving so as to provide a large driving power during high speed driving.

11. The control system according to claim 9, wherein said constant providing means sets said first constant to a large value when an opening rate $d\theta/dt$ of a throttle of the engine is large whereby the actual transmission ratio quickly converges to the first desired transmission ratio value.

12. The control system according to claim 1, further comprising
transmission ratio changing speed correcting means responsive to said first desired value signal for correcting the transmission ratio changing rate to a high rate.

13. The control system according to claim 1, wherein said correcting means is responsive to said second desired value signal for correcting the actual transmission ratio to the second desired transmission ratio value substantially as the acceleration reaches a maximum point.

14. The control system according to claim 1, wherein said detecting means comprises a kickdown detecting means for producing said acceleration signal representing kickdown.

* * * * *